United States Patent
Jang et al.

(10) Patent No.: US 7,999,996 B2
(45) Date of Patent: Aug. 16, 2011

(54) ELECTROPHORESIS DEVICE COMPRISING HOLE-CONTAINING STRUCTURE AND METHOD FOR FABRICATING THE SAME

(75) Inventors: Jae Eun Jang, Seoul (KR); Jai Yong Han, Gyeonggi-Do (KR)

(73) Assignee: Samsung Electronics Co., Ltd. (KR)

( * ) Notice: Subject to any disclaimer, the term of this patent is extended or adjusted under 35 U.S.C. 154(b) by 667 days.

(21) Appl. No.: 11/876,232

(22) Filed: Oct. 22, 2007

(65) Prior Publication Data

US 2009/0032402 A1 Feb. 5, 2009

(30) Foreign Application Priority Data

Jul. 5, 2007 (KR) ........................ 10-2007-0067551

(51) Int. Cl.
G02B 26/00 (2006.01)

(52) U.S. Cl. ....................................... 359/296

(58) Field of Classification Search .................. 359/296, 359/265–275; 430/32, 34, 38; 204/450, 204/600

See application file for complete search history.

(56) References Cited

U.S. PATENT DOCUMENTS

| | | | | |
|---|---|---|---|---|
| 6,876,486 B2 * | 4/2005 | Hiraoka et al. | ............... | 359/296 |
| 7,477,442 B2 * | 1/2009 | Iwamatsu et al. | ............. | 359/296 |
| 7,499,211 B2 * | 3/2009 | Suwabe et al. | ................ | 359/296 |
| 7,561,324 B2 * | 7/2009 | Duthaler et al. | ............. | 359/296 |
| 7,564,615 B2 * | 7/2009 | Ahn et al. | ...................... | 359/296 |

FOREIGN PATENT DOCUMENTS

| KR | 10-2004-0108095 | 12/2004 |
|---|---|---|
| KR | 10-2006-0055298 | 5/2006 |

OTHER PUBLICATIONS

Korean Office Action issued from Korean Patent Office on Jan. 14, 2009.

* cited by examiner

*Primary Examiner* — William C Choi
*Assistant Examiner* — Tuyen Tra
(74) *Attorney, Agent, or Firm* — Cantor Colburn LLP

(57) ABSTRACT

Disclosed herein are an electrophoresis device comprising a hole-containing structure and a method for fabricating the same. By which electrophoretic particles are embedded into holes, the optical properties of the device can be controlled. The electrophoresis device includes a structure having inherent optical properties, thus realizing improvement in reliability and display quality. Since the electrophoresis device uses a gas or vacuum as a medium of the electrophoretic particles, it can be driven with a high speed.

24 Claims, 8 Drawing Sheets

ELECTROPHORESIS DEVICE COMPRISING HOLE-CONTAINING STRUCTURE AND METHOD FOR FABRICATING THE SAME

This non-provisional application claims priority under 35 U.S.C. §119 to Korean Patent Application No. 10-2007-0067551, filed on Jul. 5, 2007 in the Korean Intellectual Property Office (KIPO), the entire contents of which are incorporated herein by reference.

BACKGROUND OF THE INVENTION

1. Field of the Invention

Example embodiments include an electrophoresis device comprising a hole-containing structure and a method for fabricating the same. Example embodiments include an electrophoresis device that is capable of controlling optical properties by which electrophoretic particles are embedded into holes and comprises a hole-containing structure exhibiting inherent optical properties, and a method for fabricating the same.

2. Description of the Related Art

Electrophoretic display devices are one of flat panel display devices used in electronic books, etc. Electrophoretic display devices comprise charged particles placed between two substrates, where an electric field-generating electrode is formed. When a voltage is applied across the two opposite electrodes, the particles are migrated toward the electrode bearing the opposite charge from that of the particles, thereby representing an image.

Since electrophoretic display devices have superior reflectivity and large contrast ratios, are free from dependency of a viewing angle, unlike liquid crystal displays, and are bistable, they maintain image representation even without continuous application of a voltage and thus enable low power consumption. In addition, electrophoretic display devices need no constituent component such as a polarizing layer, an alignment layer and liquid crystals, thus being considerably advantageous in terms of price competition.

FIG. 1 is a schematic view illustrating the structure and driving principle of a conventional electrophoresis device. Referring to FIG. 1, white (7W) and black (7B) charged particles 7 are fed to the space between two parallel substrates (i.e. an upper substrate 1 and a lower substrate 4), including a conductive electrodes 2 and 5, respectively. The two particles are oppositely charged and are thus separated to opposite substrates according to an applied electric field. As shown in FIG. 1A, in a case where the white particles (7W) are negatively (−) charged and the black particles (7B) are positively (+) charged, when a negative voltage is applied to the upper substrate, the black particles (7B) and the white particles (7W) are adsorbed on the upper substrate 1 and the lower substrate 4 bearing the positive charge, respectively. Thus, when a white light 9 is introduced from the outside, the black particles 7B absorb the incident light 9 and thus reflect no light. For this reason, an observer notices a black light. In an opposite case, the white particles (7W) are adsorbed on the upper substrate 1 and reflect all incident lights, thereby allowing the observer to notice a white light.

However, in the prior arts, the use of positively- and negatively charged particles makes it difficult to realize a desired reliability and driving of the device. FIGS. 2A and 2B are schematic views illustrating problems associated with a particle migration mode of a conventional electrophoresis device. Referring to FIG. 2A, white (7W) and black (7B) particles, oppositely charged, are in contact with each other and neutralized due to inherent electric attraction therebetween, regardless of the type of an applied driving electric field. As a result, the particles lose their charges and can thus no longer be driven by the electric field.

To prevent such a phenomenon, each charged particle may be capped with an insulating film, or deprived of its electron giving/taking function with the use of particle characteristics. Although charged particles are capped with an insulating film, there exists the electric attraction between the particles. Thus, two particles are in contact with each other to form a dipole, as shown in FIG. 2B. The formation of this dipole causes an undesirable increase in driving voltage since a driving electric field high enough to break the dipole and allow the particles to migrate must be applied across the substrates.

In an attempt to solve the afore-mentioned problems, an electrophoresis device, in which a barrier rib is formed, was suggested, as shown in FIG. 3. Referring to FIG. 3, an electrode 1 is arranged on either an upper substrate 1 or a lower substrate 4 and a counter electrode 5 is arranged on a barrier rib 10. Positively-charged black particles (7B) and a white reflective layer 11 are arranged above and under the lower substrate 4, respectively. When an electric field is applied to the device, the black particles (7B) are adsorbed on the upper substrate 1 and absorb an incident lights thus allowing the observer to notice a black light. On the other hand, when an electric field bearing the opposite charge is applied to the device, the black particles (7B) are adsorbed on the barrier rib 10. Thus, an incident light passes through the device and is reflected by the reflective layer 11, thus allowing the observer to notice a white light. Reversely, the device may be driven by using a black reflective layer and white particles, instead of the white layer 11 and the black particles, respectively. However, the device having the structure and driving principle involves the necessity of the barrier rib and has the difficulty of forming the electrodes on the barrier rib.

SUMMARY OF THE INVENTION

In an attempt to solve the problems of prior arts, example embodiments of the present invention include an electrophoresis device that uses one type of charged particles to avoid problems (e.g. neutralization and dipole) resulting from the use of two types of charged particles and is capable of realizing black and white representation via introduction of a simple structure.

Other example embodiments of the present invention include an electrophoresis device with improved color-quality and superior stability.

Other example embodiments of the present invention include a method for fabricating an electrophoresis device.

In accordance with example embodiments of the present invention, there is provided an electrophoresis device comprising: a transparent electrode including a transparent substrate and a conductive layer arranged on the transparent substrate; a counter electrode facing the transparent electrode and including a counter substrate and a conductive layer arranged on the counter substrate; electrophoretic particles suspended in a medium filled the space between the transparent electrode and the counter electrode, wherein the electrophoresis device includes a structure with a plurality of holes interposed between the transparent electrode and the counter electrode and the medium of the electrophoretic particles is a gas or vacuum.

In accordance with other example embodiments of the present invention, there is provided an electrophoresis device comprising: a transparent electrode including a transparent substrate and a conductive layer arranged on the transparent substrate; a counter electrode facing the transparent electrode and including a counter substrate and a conductive layer arranged on the counter substrate; two types of electrophoretic particles suspended in a medium filled the space between the transparent electrode and the counter electrode, wherein the electrophoresis device includes a structure with a plurality of holes interposed between the transparent electrode and the counter electrode and the medium of the electrophoretic particles is a gas or vacuum.

In accordance with example embodiments of the present invention, there is provided an electrophoresis device comprising: a method for fabricating an electrophoresis device comprising: 1) producing a transparent electrode and a counter electrode; 2) forming a structure with a plurality of holes on the counter electrode; 3) assembling the transparent electrode with the counter electrode and vacuumizing the space between the transparent electrode and the counter electrode; and 4) feeding electrophoretic particles between the two electrodes and sealing.

BRIEF DESCRIPTION OF THE DRAWINGS

Example embodiments will be more clearly understood from the following detailed description taken in conjunction with the accompanying drawings. FIGS. 1-11B represent non-limiting, example embodiments as described herein.

FIG. 4 is a schematic view illustrating an electrophoresis device where a hole-containing structure is interposed between a transparent electrode and a counter electrode, according to one example embodiment of the present invention;

FIG. 6 is a schematic view illustrating an electrophoresis device comprising a hole-containing structure made of powdery particles, according to another example embodiment of the present invention;

FIG. 7 is a cross-sectional view illustrating planarization of the hole-containing structure in FIG. 6;

FIG. 8 is a schematic view illustrating a process for forming holes into the structure by an imprinting method with the use of a paste or gel, according to another example embodiment of the present invention;

FIG. 10 is a schematic view illustrating an electrophoresis device in which two types of colored-electrophoretic particles and a hole-containing structure are employed, according to another example embodiment of the present invention;

FIG. 11B shows colors represented by the electrophoresis device according to the present invention.

DESCRIPTION OF THE PREFERRED EMBODIMENTS

The present invention will now be described in greater detail with reference to the accompanying drawings.

Figure 1A:
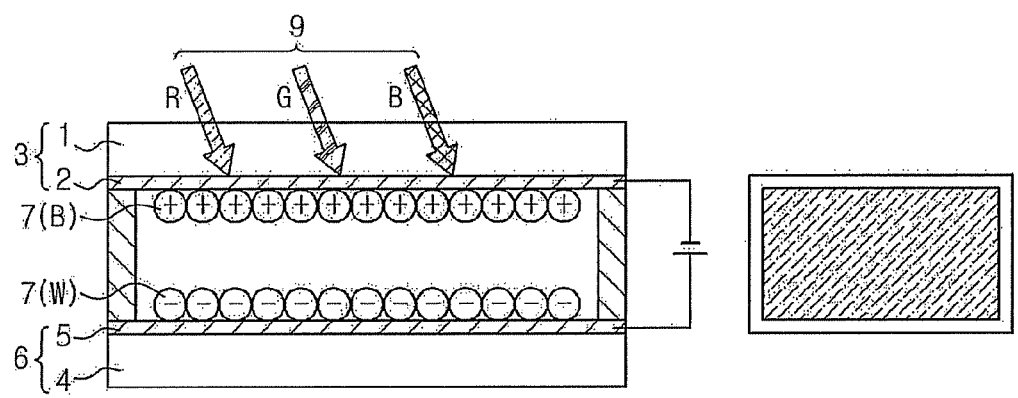
FIGS. 1A and 1B are schematic views illustrating the structure and driving principle of a conventional electrophoresis device.
Figure 1B:
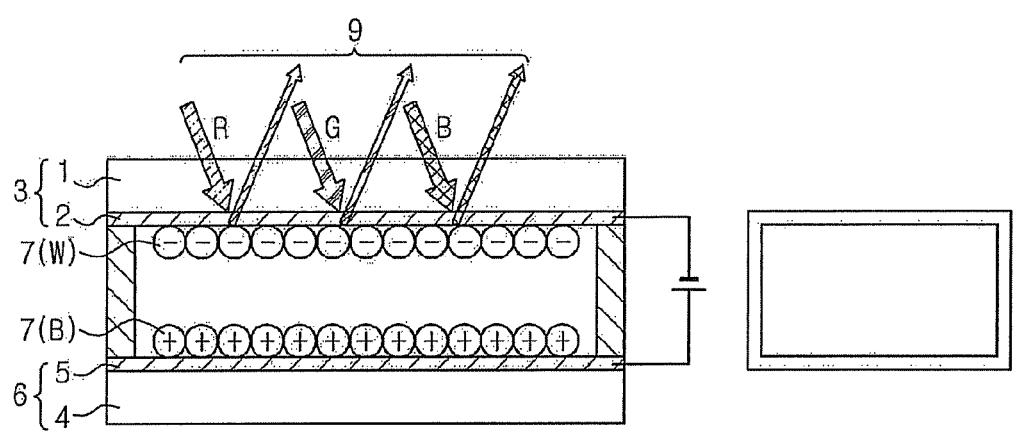
Figure 2A:
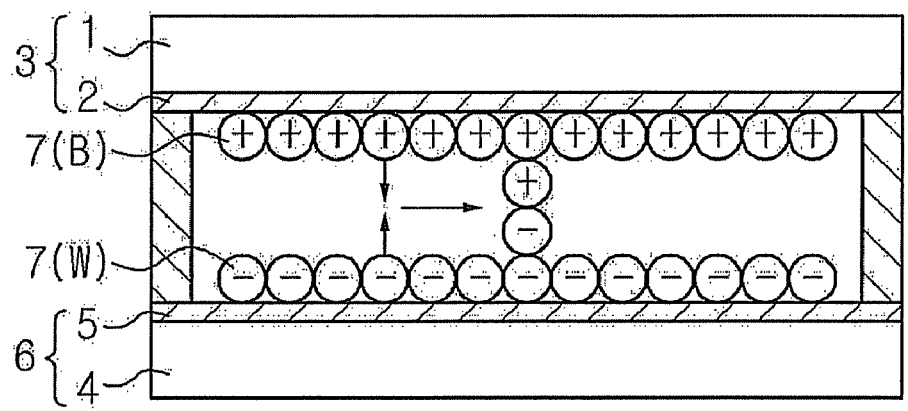
FIGS. 2A and 2B are schematic views illustrating problems associated with a migration mode of electrophoretic particles contained in a conventional electrophoresis device.
Figure 2B:
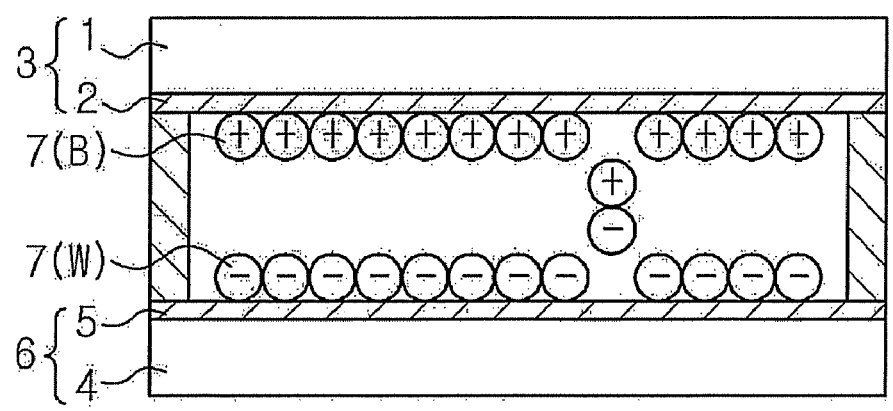
Figure 3A:
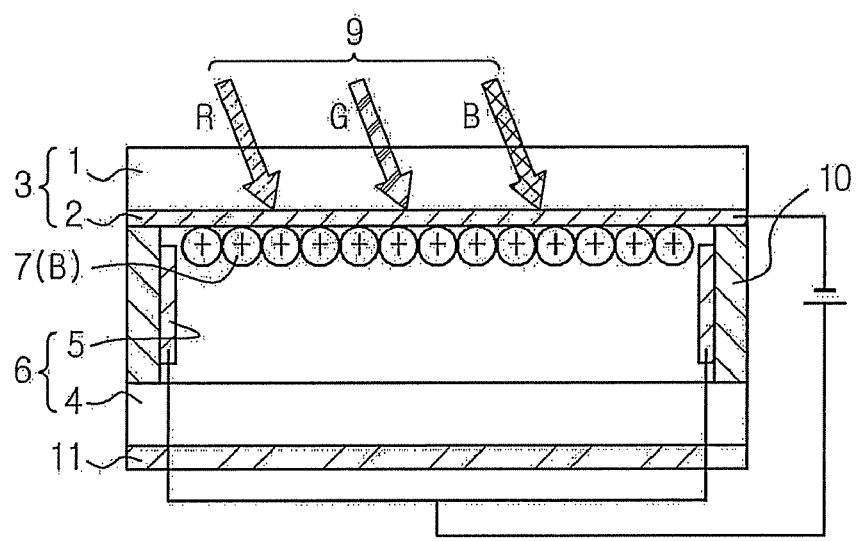
FIGS. 3A and 3B are schematic views illustrating an electrophoresis device, where a barrier rib is formed, to solve the problems in the prior art.
Figure 3B:
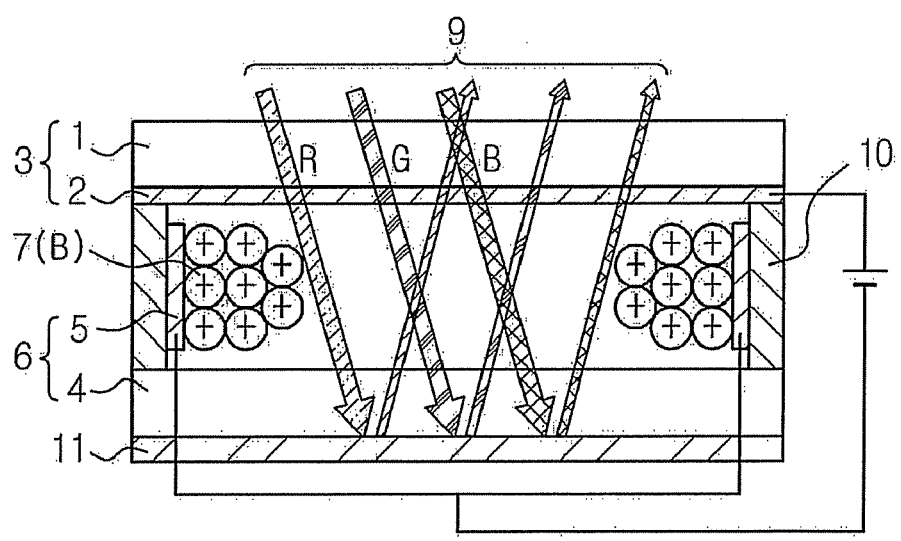
Figure 4:
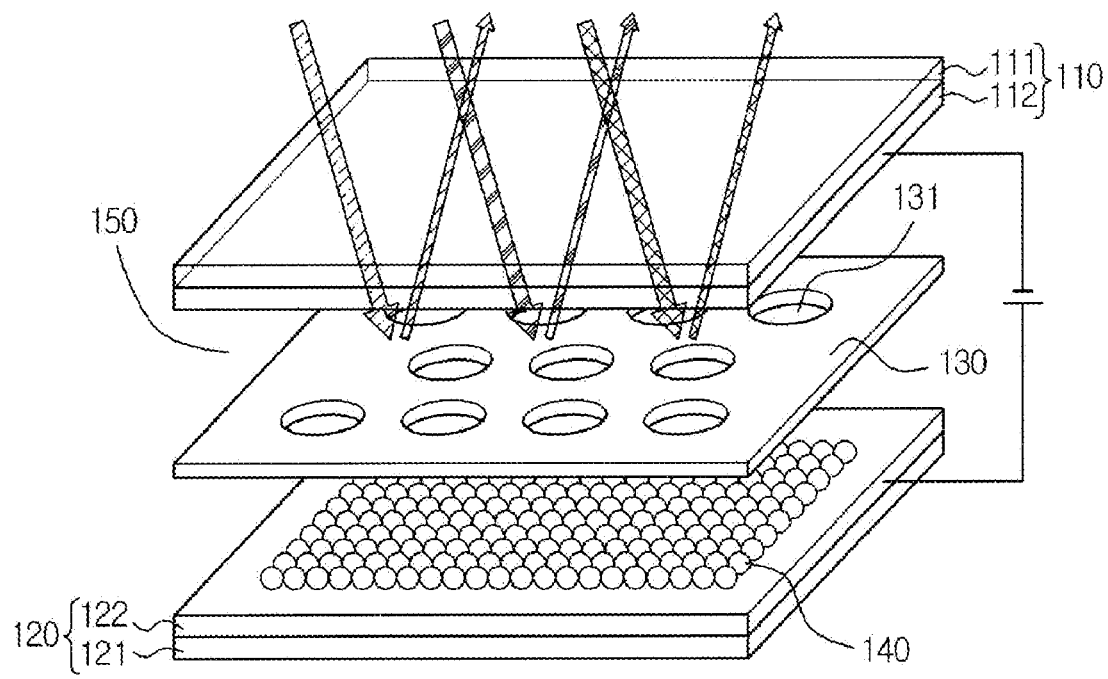
Figure 5A:
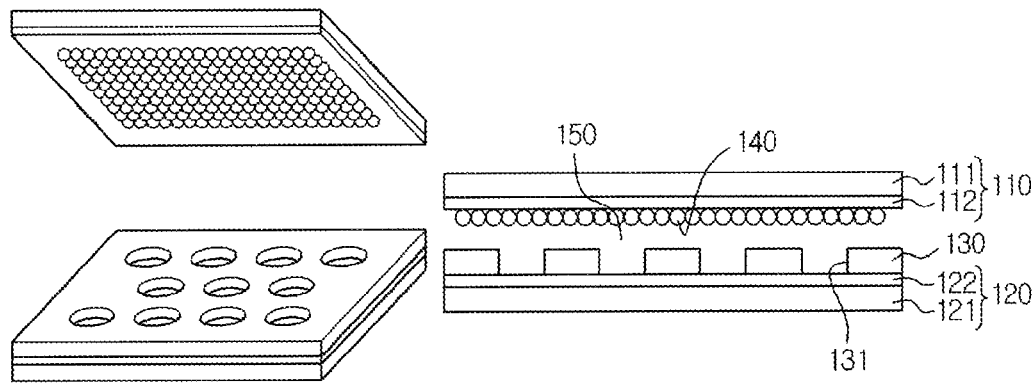
FIGS. 5A and 5B are schematic views illustrating an electrophoresis device where a hole-containing structure is formed on a counter electrode, according to another example embodiment of the present invention.
Figure 5B:
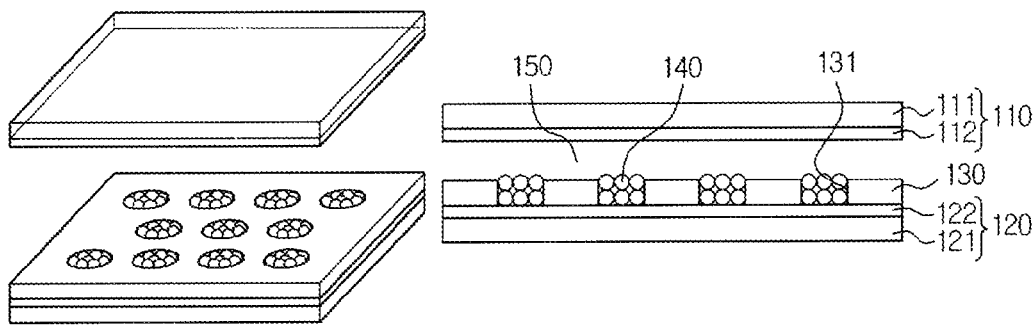

FIG. 4 is a schematic view illustrating an electrophoresis device where a hole-containing structure is interposed between a transparent electrode and a counter electrode, according to one example embodiment of the present invention. FIGS. 5A and 5B are schematic views illustrating an electrophoresis device where a hole-containing structure is formed on a counter electrode, according to another example embodiment of the present invention.

As shown in FIG. 4, the electrophoresis device includes a transparent electrode 110, a counter electrode 120 arranged on the transparent electrode 110, a structure 130 with a plurality of holes 131 interposed between the transparent electrode 110 and the counter electrode 120, a medium 150 filled into the space between the transparent electrode 110 and the counter electrode 120, and electrophoretic particles 140 suspended in the medium 150.

As mentioned above, the electrophoresis device includes the structure 130 with a plurality of holes 131 interposed between the transparent electrode 110 and the counter electrode 120.

The hole-containing structure 130 inherently exhibits optical properties and the optical properties of the device can be controlled by embedding electrophoretic particles into the holes.

The hole-containing structure 130 may be formed as an intermediate layer arranged between the transparent electrode 112 and the counter electrode 120 as shown in FIG. 4, or formed on a counter electrode as shown in FIGS. 5A and 5B.

Preferably, the hole-containing structure 130 is formed on a counter electrode, as shown in FIGS. 5A and 5B. This is the reason that the formation of the structure 130 on the counter electrode 120 has the potential applications for various shapes of the structure, in addition to a film (e.g. a substrate) and enables embedment of the electrophoretic particles 140 into the holes 131 of the structure.

According to the electrophoresis device of example embodiment, the bottom of the holes 131 of the structure 130 is exposed to the electrode layer, thus enabling the electrophoretic particles 140 to be in contact with the electrodes through the holes 131. Accordingly, an electric field applied to the device of the present invention results in the electric attraction between the electrode layer and the electrophoretic particles, enabling several tens to several hundreds of the electrophoretic particles 140 to be adsorbed or embedded into the holes 131.

The embedment of electrophoretic particles 140 into the holes 131 reduces the total volume of the device, and eliminates the necessity of the space in which an intermediate layer is located and the complexity associated with the production of the intermediate layer.

The structure 130 may have a thickness of 0.1 µm. When the structure has a thickness smaller than 0.1 µm, it cannot sufficiently perform its reflection function, allowing an incident light to permeate through thereof.

There is no particular limitation for the shape of the hole. Preferably, the hole has a circular shape, imparting advantages of the passage and embedment area of electrophoretic particles.

In addition, the area of the holes 131 is preferably 50% or less of the structure area. When the holes 131 have an area larger than 50% of the structure, color contrast may be eliminated.

As the structure 130, a prepared porous substrate may be used. There may be used a structure in which the porous substrate is bonded on the counter electrode 120.

Any material may constitute the structure 130 so long as it can be used for the substrate 121. Specific examples of the structure 130 materials include, but are not limited to silicone, sapphire, glass, silicone-coated glass, indium tin oxide, mica, graphite, molybdenum sulfide and metal (e.g. copper, zinc, aluminum, stainless steel, magnesium, iron, nickel, gold or silver). In addition, specific examples of the structure 130 include plastic substrates made of a polyimide, polyester, polycarbonate or acrylic resin.

Figure 6:
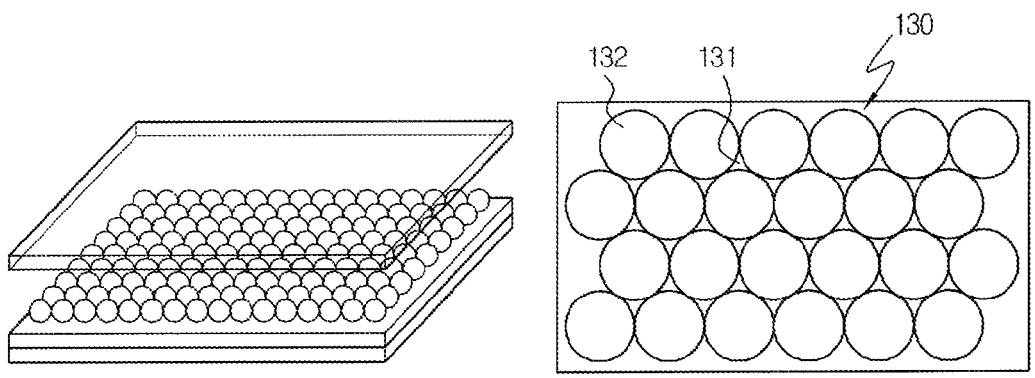

A method for forming holes 131 in the substrate-type structure 130 is not particularly limited in the present invention. For example, formation of holes 131 in the structure 130 may be carried out by mold casting, processing with laser irradiation, exposure to light and etching. The structure 130 may be formed by applying or arranging powdery particles. FIG. 6 is a schematic view illustrating an electrophoresis device including a hole-containing structure 130 made of powdery particles, according to another example embodiment of the present invention.

Referring to FIG. 6, powdery particles 132 are homogeneously arranged or applied to form the structure 130 and voids present between the powdery particles 132 constituting the structure 130 function as the holes 131.

Figure 7:
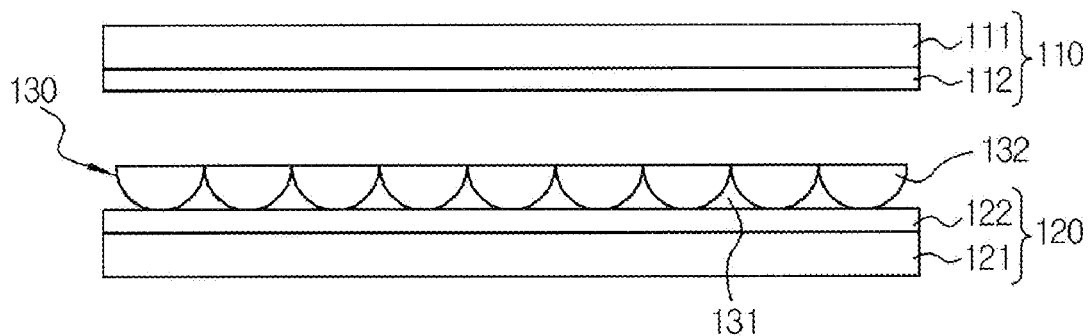

FIG. 7 is a cross-sectional view illustrating planarization of the hole-containing structure made of powdery particles. FIG. 7 shows that the top of the structure 130 made of the powdery particles 132 is evened by planarization to improve reflectivity.

As the powdery particles 132, there may be used a spherical shape of organic, inorganic or metal powders. Examples of inorganic powders include, but are not limited to silica, glass, aluminum oxide, aluminum nitride, magnesia, boron nitride, silicon boron, beryllia, silicon carbide, boron carbide and titanium carbide. The particles 132 have a size of several tens to several hundreds of microns. The particles 132 are prepared by various methods, e.g. dispersing powders in a liquid phase and precipitation, or mixing powders with a solvent, coating and drying. As adsorption methods, there may be mentioned, for example, sintering particles on a substrate by heating, applying particles to a substrate coated with an adhesive agent, or applying particles coated with an adhesive agent to a substrate.

In another example embodiment, the structure 130 is made of a paste or gel-type material 134 and the hole 131 is formed by etching or imprinting the material 134.

Figure 8:
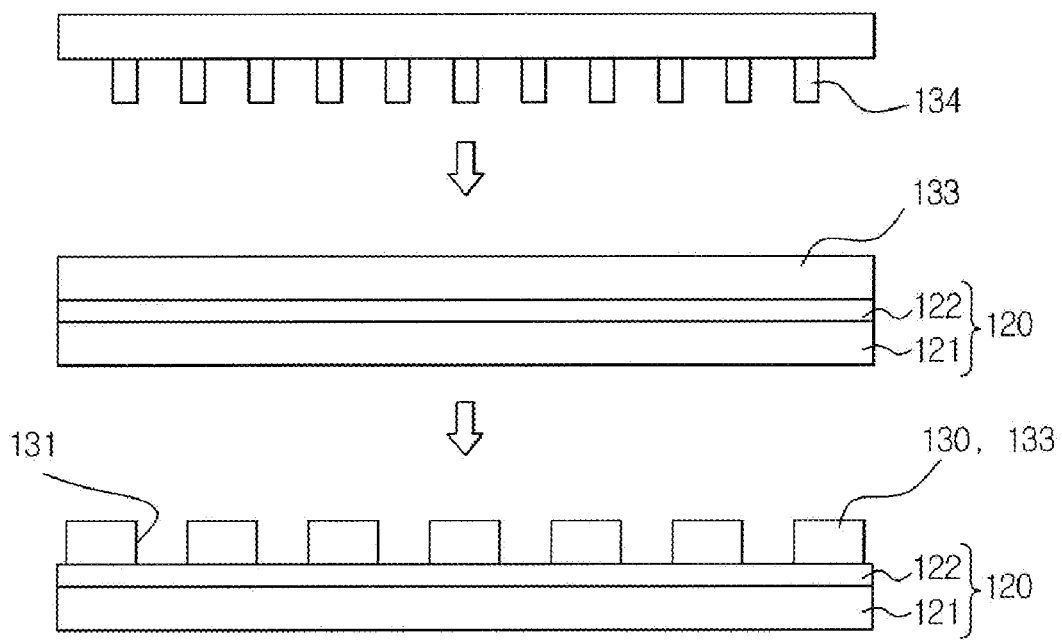

FIG. 8 is a schematic view illustrating a process for forming holes into the structure via an imprinting method with the use of a paste or gel according to another example embodiment. Referring to FIG. 8, the paste or gel-type material 133 is applied to the surface of the conductive layer 122 and the applied material is subjected to etching or imprinting to form holes 131.

As an example of the imprinting method, holes are formed in the material 133 with the use of a mold 134 and the mold is removed to obtain the holes 131.

Alternatively, the holes 131 may be formed by coating a photosensitive photoresist composition on the material 134, selectively exposing a hole-region to light, and etching the exposed region. At this time, the photoresist composition and exposure conditions are not limited particularly.

The etching may be carried out by a conventional method, e.g. wet etching or dry etching, without particular limitation.

The hole-containing structure may be a gel-, dried- or plastic-phase.

Examples of the paste or gel material 133 that can be used in the present invention include, but are not limited to: a ferroelectric insulator selected from the group consisting of $Ba_{0.33}Sr_{0.66}TiO_3$(BST), $Al_2O_3$, $Ta_2O_5$, $La_2O_5$, $Y_2O_3$ and $TiO_2$; a inorganic insulator selected from the group consisting of $PbZr_{0.33}Ti_{0.66}O_3$ (PET), $Bi_4Ti_3O_{12}$, $BaMgF_4$, $SrBi_2(TaNb)_2O_9$, $Ba(ZrTi)O_3$ (BZT), $BaTiO_3$, $SrTiO_3$, $Bi_4Ti_3O_{12}$, $SiO_2$, $SiNx$, $AlON$; and an organic insulator selected from the group consisting of polyimide, benzocyclobutane (BCB) parylene, polyacrylate, polyvinylalcohol and polyvinylphenol.

The structure 130 has inherent optical properties. That is, the structure 130 is made of a light-reflective or light-absorbing material, or is dyed with a colorant to realize light-reflection or light-absorbance. The structure 130 may be dyed with a colorant of black, white or other colors and examples of preferred colorants include dyes used commonly in the art, organic dyes and inorganic dyes.

Referring to FIG. 5, the electrophoresis device according to the present invention uses a gas or vacuum as a medium 150 interposed between the transparent electrode 110 and the counter electrode 120.

Examples of the gas that can be used as the medium 150 include $N_2$, $CO_2$, Ar and air. When the inner pressure of the electrophoresis device is a vacuum, it is preferably adjusted to $10^{-1}$ to $10^{-6}$ Torr with the use of a vacuum pump.

In the present invention, a gas or vacuum is used as the medium of the electrophoresis device, thus realizing a rapid reaction speed.

The device fabricated with the use of a gas or vacuum as medium according to the present invention causes no problem e.g. quality deterioration and contamination which is due to liquid leakage resulting from the use of a liquid medium. Furthermore, such a device can be fabricated in a considerably easy manner.

The electrophoretic particles 140 used in the present invention are subjected to electrophoresis (electrophorical migration) according to their bearing charge (positive or negative) and dyed with black, white and other colors.

The electrophoresis device may employ one type of particles. In addition, the color of the structure 130 is different from that of the electrophoretic particles 140. That is, when the structure 130 exhibits black, the electrophoretic particles 140 exhibits white, and vice versa.

Examples of the electrophoretic particles 140 include, but are not limited to an organic pigment, inorganic pigment, a metallic powder, a colored-glass, and a colored-nonpowder (e.g. resin)

Examples of the transparent electrode 111 that can be used in the present invention include transparent inorganic substrates, such as quartz and glass, and transparent plastic substrates, such as polyethylene terephthalate (PET), polyethylene naphthalate (PEN), polycarbonate, polystyrene and polypropylene and are not particularly limited thereto. Preferred is the use of a flexible substrate.

The conductive material 112 coated on the transparent substrate 111 may be of any type so long as it is transparent and specific examples thereof include, but are not limited to indium, tin oxide (ITO), fluorine-doped tin oxide (FTO), and a conductive polymer e.g. phenyl polyacetylene or polythiophene.

Preferably, the transparent electrode 110 has high transparency. Preferably, the transparent electrode 110 has a transmissivity of 75% or more, more preferably of 80% or more.

Unlike the transparent substrate ill, the substrate 121 that can be used in the present invention 121 is not necessarily transparent and may be of any type commonly used in the art.

A material for the conductive layer 122 constituting the counter electrode 120 is not necessarily transparent and any material may be used without particular limitation so long as it is conductive.

The driving mechanism of the electrophoresis device of the present invention will be described with reference to FIGS. 5A and 5B in detail.

Referring to FIG. 5A, in the case where the electrophoresis device of the present invention includes positively-charged black particles 140 and a white hole-containing structure 130, when a negative voltage is applied to the conductive layer 112 of the transparent electrode 110, the positively-charged black particles 140 are adsorbed on the conductive layer 112 of the transparent electrode 110, allowing the device to represent a black image.

On the other hand, referring to FIG. 5B, under the conditions as mentioned above, when a negative voltage is applied to the conductive layer 122 of the counter electrode 120, the positively-charged black particles 140 are embedded into the holes 131 of the white structure 130. As a result, incident light is mostly reflected by the white structure 130 and embedded black particles are distributed in a micron-scale limited region which makes it difficult for an observer to notice, thus allowing the observer to notice a white image.

Alternatively, in the case where the electrophoresis device employs white particles and a black structure absorbing light, the same results as above can be obtained.

The electrophoresis device of the present invention can represent a white or black image by suitably controlling a driving mode of one type of charged particles or with the structure. Accordingly, the electrophoresis device avoids problems resulting from the use of two types of charged particles e.g. driving defects due to neutralization and increased driving voltage due to formation of dipoles.

In addition, the use of a gas or vacuum as a medium contributes to realize a fast reaction rate.

Figure 9A:
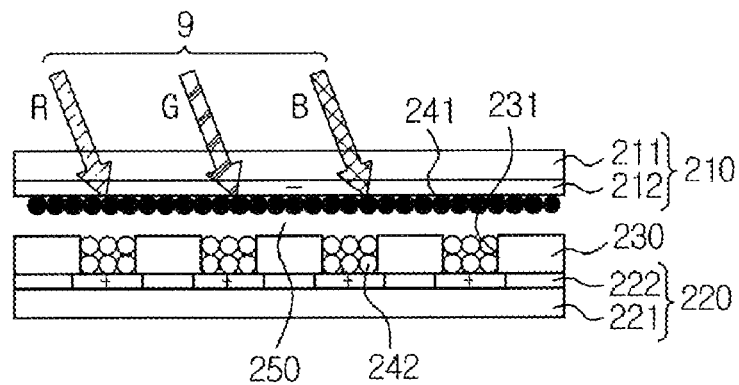
FIGS. 9A, 9B and 9C are schematic views illustrating an electrophoresis device in which two types of electrophoretic particles and a hole-containing structure are employed, according to another example embodiment of the present invention.
Figure 9B:
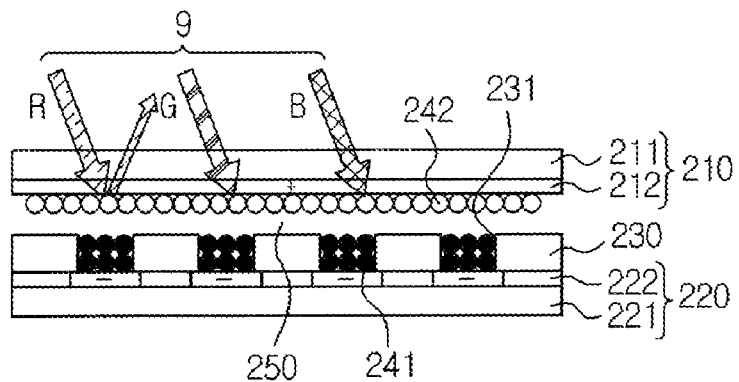
Figure 9C:
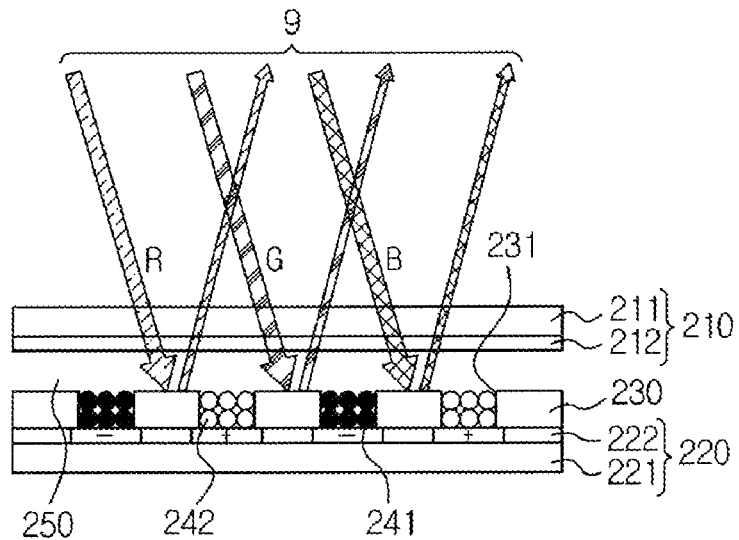

FIGS. 9A, 9B and 9C are schematic views illustrating an electrophoresis device in which two types of electrophoretic particles and a hole-containing structure are employed, according to another example embodiment.

As shown in FIG. 9A, the electrophoresis device includes a transparent electrode 210, a counter electrode 220 arranged on the transparent electrode 210, a structure 230 with a plurality of holes 231 interposed between the transparent electrode 210 and the counter electrode 220, a medium 250 filled into the space between the transparent electrode 210 and the counter electrode 220, and two types of electrophoretic particles 241 and 242 suspended in the medium 250.

The two types of electrophoretic particles 241 and 242 are oppositely charged and realize thus color representation.

The electrophoresis device can be driven by patterning the conductive layer 222 arranged on the counter electrode 220.

The formation of patterns on the conductive layer 222 is carried out by coating a photosensitive photoresist composition on the conductive layer 222, selectively exposing the conductive layer region to be etched to light and etching the exposed conductive layer.

The structure 230 may be dyed with various colors e.g. black and white. The structure 230 may be colored with one or two selected from the group consisting of red, green, blue, cyan, magenta and yellow. The structure 230 may be white and the two types of electrophoretic particles 241 and 242 are red and cyan, green and magenta blue and yellow, respectively.

Referring to FIG. 9A in more detail, the electrophoresis device includes (+) charged black particles 241 and (−) charged red particles 242 and the white structure 230.

At this time, when a negative voltage is applied to the conductive layer 212 of the transparent electrode 210 and a positive voltage is applied to the patterned conductive layer 222, the black particles are adsorbed on the upper substrate, allowing the device to represent a black image.

On the other hand, referring to FIG. 9B, when a positive voltage is applied to the conductive layer 212 and a negative voltage is applied to the patterned conductive layer 222, the red particles are adsorbed on the upper substrate, allowing the device to represent a red image.

Meanwhile, Referring to FIG. 9C, since the conductive layer 222 can be independently driven at each pattern, the positive and negative voltages are applied to the conductive layer 222 and the electrode of the upper substrate is floated, red particles 242 and black particles 241 are embedded into the holes 231 of the white structure 230, allowing the device to represent a white image.

In the case of a conventional electrophoresis device in which three colors (white, black and red) of particles are charged to represent colors, two types of particles bare the same charge. Thus, to drive such a device, three types of particles must be induced to differentially migrate, thus making it difficult to practically realize.

However, according to the electrophoresis device of the present invention, the structure has inherently optical properties and the optical properties of the device can be controlled by embedding electrophoretic particles into holes. Unlike the conventional device, the device realizes color representation, even though two types of particles are used, thus enabling superior stable realization.

Figure 10:
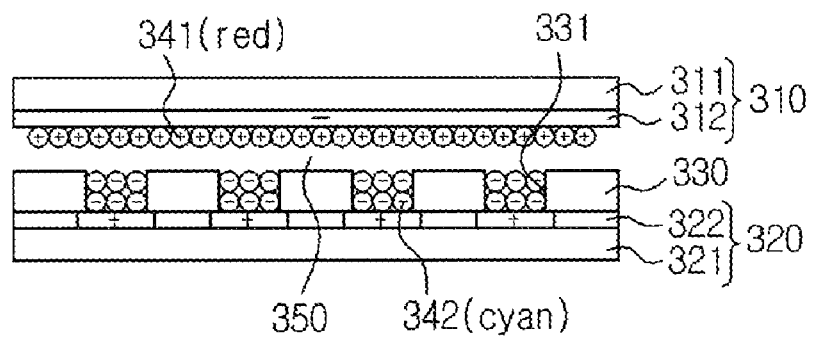

FIG. 10 is a schematic view illustrating an electrophoresis device in which two types of colored-electrophoretic particles and a hole-containing structure are employed, according to another example embodiment.

Referring to FIG. 10, the electrophoresis device includes (+) charged red particles 341 and (−) charged cyan particles 342 and the white structure 330.

In more detail, when a negative voltage is applied to the conductive layer 312 of the transparent electrode 310 and a positive voltage is applied to the patterned conductive layer 322, the red particles are adsorbed on the upper substrate, allowing the device to represent a red image.

A display generally realizes color representation through an array of unit pixels representing red, green and blue. Thus, as shown in FIG. 10, the electrophoresis device may include a plurality of unit pixel arrays consisting of the white structure and the two types of electrophoretic particles, which are red and cyan, green and magenta, or blue and yellow, respectively.

Figure 11A:
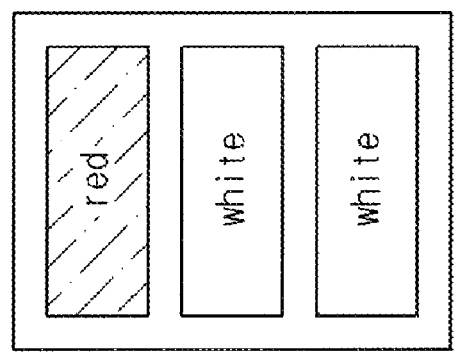
FIG. 11A shows colors represented by an electrophoresis device according to the prior art.
Figure 11B:
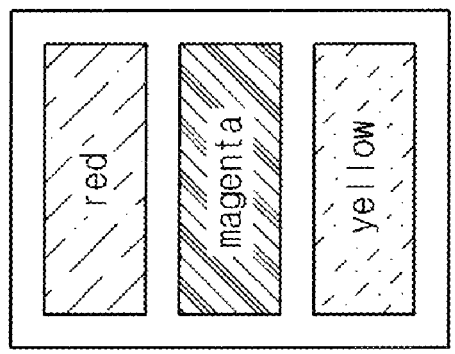

FIG. 11A shows colors represented by an electrophoresis device according to the prior art. FIG. 11B shows colors represented by the electrophoresis device according to the present invention.

Referring to FIG. 11A, red is represented with the use of three unit cells. That is, a red-showing unit cell represents red and the remaining two unit cells (corresponding to green and blue, respectively) represent white, thereby allowing the observer to notice red. In this case, in practice, the observer notices only a small amount of red light, thus causing deterioration of color definition.

FIG. 11B shows a color representation method employing the unit pixel array of the present invention shown in the FIG. 10. According to red representation using this method, a red-showing cell represents red, the cell corresponding to green represents magenta and the cell corresponding to blue represents yellow. Accordingly, a red light is reflected from the green and blue cells as well as the red cell, and a small amount of green and blue light is reflected, as compared to the case where white light is reflected. As a result, the observer notices red light with more superior resolution, realizing more excellent visibility.

In another example embodiment, the present invention is directed to a method for fabricating an electrophoresis device comprising: 1) producing a transparent electrode and a counter electrode; 2) forming a structure with a plurality of holes on the counter electrode; 3) assembling the transparent electrode with the counter electrode and vacuumizing the space between the transparent electrode and the counter electrode; and 4) feeding electrophoretic particles between the two electrodes and sealing.

The step 2) of formation of the structure may be carried out by bonding a prepared porous plate on the conductive layer of the counter electrode.

Alternatively, the step 2) of formation of the structure may be carried out by applying powdery particles to the conductive layer of the counter electrode.

The step 2) of formation of the structure may include the sub-steps of: applying a paste or gel material to the conductive layer; coating a photosensitive photoresist composition on material; selectively exposing a hole region of the structure to light; and etching the exposed region to form holes in the structure.

Alternatively, the step 2) of formation of the structure may include the sub-steps of: applying a paste or gel material to the conductive layer; and bonding a hard mold 134 on the material 133, subjecting the material to compression and removing the mold from the material, to form holes in the structure.

Materials used herein are the same as mentioned in the description related to the electrophoresis device.

A greater detail for the method according to example embodiment of the present invention will be given as follow:

First, a conductive material is coated on a transparent substrate to produce a transparent electrode. Then, a prepared porous substrate is bonded on the substrate where the conductive layer is formed. The transparent electrode is assembled with the counter electrode through an alignment process, the space between the two electrodes is vacuumized with a vacuum pump, and electrophoretic particles are fed into the space between the two electrodes. After completion of feeding, the side with which films are in contact is sealed with epoxy to fabricate an electrophoresis device.

The application of powdery particles to the substrate to form the structure is carried out by applying white or black powders to the substrate, where the conductive electrode is formed, with the use of dipping, spin coating or screen printing. The top of the powders may be planarized by etching, grinding or the like.

The formation of holes using an imprinting technique is carried out by applying a paste or gel material to a substrate, where the conductive electrode is formed, via spin coating or printing, drying the material, bonding a hard mold to the material, subjecting the material to compression and separating the mold form the material.

The formation of holes using lithography is carried out by forming a structure material on a substrate, where the conductive electrode is formed, spin-coating a photoresist on the structure material, subjecting the resulting structure to exposure to light through a photomask and development, and etching.

As apparent from the foregoing, according to the electrophoresis device of the present invention, since electrophoretic particles are embedded into holes, optical properties of the device can be controlled. Inclusion of a structure inherently having optical properties in the electrophoresis device enables improvement in reliability and display quality. Since the electrophoresis device uses a gas or vacuum as a medium of the electrophoretic particles, it can be operated with a high speed. Furthermore, the electrophoresis device avoids problems e.g. driving defects due to neutralization and an increase in driving voltage due to formation of dipoles. Based on these advantages, the electrophoresis device of the present invention has great potential applications for the field of flat panel displays, in particular, flexible displays and electric papers.

Although the example embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An electrophoresis device comprising;
   a transparent electrode including a transparent substrate and a conductive layer arranged on the transparent substrate;
   a counter electrode facing the transparent electrode and including a counter substrate and a conductive layer arranged on the counter substrate;
   electrophoretic particles suspended in a medium filled into the space between the transparent electrode and the counter electrode,
   wherein the electrophoresis device includes a structure with a plurality of holes interposed between the transparent electrode and the counter electrode and the medium of the electrophoretic particles is a gas or vacuum, wherein the structure is made of powdery particles and the top of the particles is evened by planarization.

2. The electrophoresis device according to claim 1, wherein the structure is formed on the counter electrode and the electrophoretic particles are embedded into the holes of the structure.

3. The electrophoresis device according to claim 2, wherein the structure is formed by applying or rearranging powdery particles.

4. The electrophoresis device according to claim 3, wherein the structure is formed by planarizing the top of the particles.

5. The electrophoresis device according to claim 1, wherein the electrophoretic particles are of one type, allowing the particles to be uniformly positively or negatively charged.

6. The electrophoresis device according to claim 1, wherein the structure is made of a light-absorbing or light-reflecting material.

7. The electrophoresis device according to claim 1, wherein the color of the structure is different from the color of the electrophoretic particles.

8. The electrophoresis device according to claim 1, wherein the structure is a porous substrate.

9. The electrophoresis device according to claim 1, wherein the structure has a thickness of 0.1 µm or more.

10. The electrophoresis device according to claim 1, wherein the holes have a size of several tens to several hundreds of micrometers.

11. The electrophoresis device according to claim 1, wherein the total area of the holes is 50% or less of the structure area.

12. The electrophoresis device according to claim 1, wherein the particles have a size of several tens to several hundreds of micrometers.

13. The electrophoresis device according to claim 1, wherein the gas is selected from the group consisting of $N_2$, $CO_2$, Ar and air.

14. The electrophoresis device according to claim 1, wherein the electrophoresis device is under vacuum of $10^{-1}$ to $10^{-6}$ Torr.

15. An electrophoresis device comprising:
   a transparent electrode including a transparent substrate and a conductive layer arranged on the transparent substrate;
   a counter electrode facing the transparent electrode and including a counter substrate and a conductive layer arranged on the counter substrate;
   two types of electrophoretic particles suspended in a medium filled into the space between the transparent electrode and the counter electrodes,
   wherein the electrophoresis device includes a structure with a plurality of holes interposed between the transparent electrode and the counter electrode and the medium of the electrophoretic particles is a gas or vacuum, wherein the structure is made of powdery particles and the top of the particles is evened by planarization.

16. The electrophoresis device according to claim 15, wherein the two types of electrophoretic particles are oppositely charged.

17. The electrophoresis device according to claim 15, wherein the electrophoresis device is driven according to patterns of the conductive layer.

18. The electrophoresis device according to claim 15, wherein the electrophoresis device includes a plurality of unit pixel arrays consisting of the structure and the two types of electrophoretic particles, wherein the structure represents white, and the two types of electrophoretic particles represent red and cyan, green and magenta, or blue and yellow, respectively.

19. A method for fabricating an electrophoresis device comprising:
   1) producing a transparent electrode and a counter electrode;
   2) forming a structure with a plurality of holes on the counter electrode; wherein the structure is made of powdery particles and the top of the particles is evened by planarization;
   3) assembling the transparent electrode with the counter electrode and vacuuming the space between the transparent electrode and the counter electrode; and
   4) feeding electrophoretic particles between the two electrodes and sealing.

20. The method according to claim 19, further comprising: after step 3), feeding a gas into the space between the two electrodes.

21. The method according to claim 19, wherein step 2) of formation of the structure is carried out by bonding a prepared porous plate on the conductive layer of the counter electrode.

22. The method according to claim 19, wherein step 2) of formation of the structure is carried out by applying powdery particles to the conductive layer of the counter electrode with the use of dipping, spin coating or screen printing.

23. The method according to claim 19, wherein the step 2) of formation of the structure includes the sub-steps of:
   applying a paste or gel material to the conductive layer;
   coating a photosensitive photoresist composition on the material;
   selectively exposing a hole region of the structure to light; and
   etching the exposed region to form holes in the structure.

24. The method according to claim 19, wherein the step 2) of formation of the structure includes the sub-steps of:
   applying a paste or gel material to the conductive layer; and
   bonding a hard mold on the material, subjecting the material to compression, and
   separating the mold from the material, to form holes in the structure.

* * * * *